US006738796B1

(12) United States Patent
Mobini

(10) Patent No.: US 6,738,796 B1
(45) Date of Patent: May 18, 2004

(54) OPTIMIZATION OF MEMORY REQUIREMENTS FOR MULTI-THREADED OPERATING SYSTEMS

(75) Inventor: Amir M. Mobini, Foster City, CA (US)

(73) Assignee: Globespanvirata, Inc., Red Bank, NJ (US)

(*) Notice: Subject to any disclaimer, the term of this patent is extended or adjusted under 35 U.S.C. 154(b) by 0 days.

(21) Appl. No.: 09/415,396

(22) Filed: Oct. 8, 1999

(51) Int. Cl.$^7$ .................................. G06F 9/00
(52) U.S. Cl. .................. 709/100; 709/316; 711/100
(58) Field of Search ................. 709/100, 102, 709/106, 107, 108, 316; 711/100

(56) References Cited

U.S. PATENT DOCUMENTS

| | | | | |
|---|---|---|---|---|
| 5,263,161 A | * | 11/1993 | Barth et al. ................. | 711/152 |
| 6,108,754 A | * | 8/2000 | Lindholm ................... | 711/122 |
| 6,237,043 B1 | * | 5/2001 | Brown et al. ............... | 709/316 |
| 6,247,025 B1 | * | 6/2001 | Bacon ........................ | 707/206 |
| 6,438,586 B1 | * | 8/2002 | Hass et al. .................. | 709/213 |

* cited by examiner

Primary Examiner—John Follansbee
Assistant Examiner—G. L. Opie

(74) Attorney, Agent, or Firm—Thomas, Kayden, Horstemeyer & Risley

(57) ABSTRACT

A system, method, and apparatus are disclosed for minimizing the memory required by memory management structures in a multi-threaded operating environment. The shortest necessary lifetime of a memory management structure is determined to allow the memory required to maintain the memory management structure to be reallocated for other uses when the memory management structure is no longer required. A memory management structure comprises a synchronization object for each data segment. A link list of synchronization nodes is also maintained to identify to the read thread a next data segment to be read and comprises a segment ready indicator that also indicates whether a data segment is available for access. If the segment ready indicator indicates to the read thread that the data segment is available for access, the read thread proceeds directly to reading the data segment without accessing the synchronization object. When the write thread has completed writing to a data segment, it can set the segment ready indicator of the synchronization node to indicate the data segment is available for the read thread and then destroy the synchronization object, freeing its memory for other uses. After reading the data segment, the read thread can then destroy the synchronization node, thus freeing the memory required to maintain this structure as well.

17 Claims, 6 Drawing Sheets

OPTIMIZATION OF MEMORY REQUIREMENTS FOR MULTI-THREADED OPERATING SYSTEMS

BACKGROUND OF THE INVENTION

1. Field of Invention

The present invention relates generally to computer architecture, and more specifically, to optimizing memory requirements for multi-threaded operating systems.

2. Description of the Background Art

Multi-threaded operating systems optimize processing time by allowing parallel operations to be executed by different threads. For example, in operations with storage media, read and write threads are used to provide simultaneous access to the storage media for both the read and write operations. However, to ensure accurate presentation of the data in the correct order, and to ensure that conflicts do not arise between the threads in attempting to access of the storage media, memory management mechanisms must be implemented to synchronize the access of the storage media and to provide identification information for the data stored in the storage media. In conventional systems, the memory management mechanisms require significant amounts of memory to maintain, for example, in systems that use synchronization objects to synchronize access to a data segment of the storage media, a synchronization object must be maintained for each data segment of the storage media. To ensure that the data segments are read in the proper order, a link list of synchronization nodes or other tracking structure is used to guide the read thread to the next data segment to be read. Thus, a read thread in operation examines the link list to determine a next synchronization node to read, and then examines the indicated synchronization object to determine whether the segment is currently being accessed by the write thread. If the synchronization object indicates the write thread is accessing the segment, the read thread is placed into a low-CPU intensive state until the segment becomes available. These structures serve a critical function in memory management, but they require a large amount of memory to maintain. Therefore, in many systems, as high-speed, processor-mapped memory is limited in size, memory quickly runs out and the systems are forced to store the memory management mechanisms in slow virtual memory. However, slow virtual memory is ineffective in systems having high data rates, for example over 10 megabits per second. Therefore, a system, method, and apparatus are needed that provides for simultaneous read and write access of memory, provides a memory management structure that identifies the location of data stored in storage media and synchronizes the accesses of the read and write threads, still provides a low-CPU usage state when conflicts arise, but does not require large amounts of memory to maintain.

SUMMARY OF THE INVENTION

In accordance with the present invention, a system, method, and apparatus are disclosed for minimizing the memory required by memory management structures in a multi-threaded operating environment. More specifically, the present invention dynamically determines the shortest necessary lifetime of a memory management structure to allow the memory required to maintain the memory management structure to be reallocated for other uses when the memory management structure is no longer required. Additionally, the present invention provides for a structure that shortens the necessary lifetime of a memory management structure.

In one embodiment, a memory management structure comprises a conventional synchronization object for each data segment. The synchronization object synchronizes the access to a data segment between write and read threads and provides a low-processor intensive state for a read thread if the read thread attempts to access a data segment to which the write thread already has access. A link list of synchronization nodes is also maintained to identify to the read thread a next data segment to be read. However, in accordance with the present invention, the synchronization node comprises a segment ready indicator that also indicates whether a data segment is available for access. If the segment ready indicator indicates to the read thread that the data segment is available for access, the read thread proceeds directly to reading the data segment without accessing the synchronization object. Accordingly, when the write thread has completed writing to a data segment, it can set the segment ready indicator of the synchronization node to indicate the data segment is available for the read thread and then destroy the synchronization object, freeing its memory for other uses. The segment ready indicator is a simple data structure that requires much less memory to maintain than the synchronization object because it is not required to provide, among other functions, a low CPU-intensive state. After reading the data segment, the read thread can then destroy the synchronization node, thus freeing the memory required to maintain this structure as well. Thus, in accordance with the present invention, a system, method, and apparatus are disclosed that minimize the memory requirements of memory management structures of a multi-threaded operating systems.

DETAILED DESCRIPTION OF THE PREFERRED EMBODIMENTS

Figure 1:
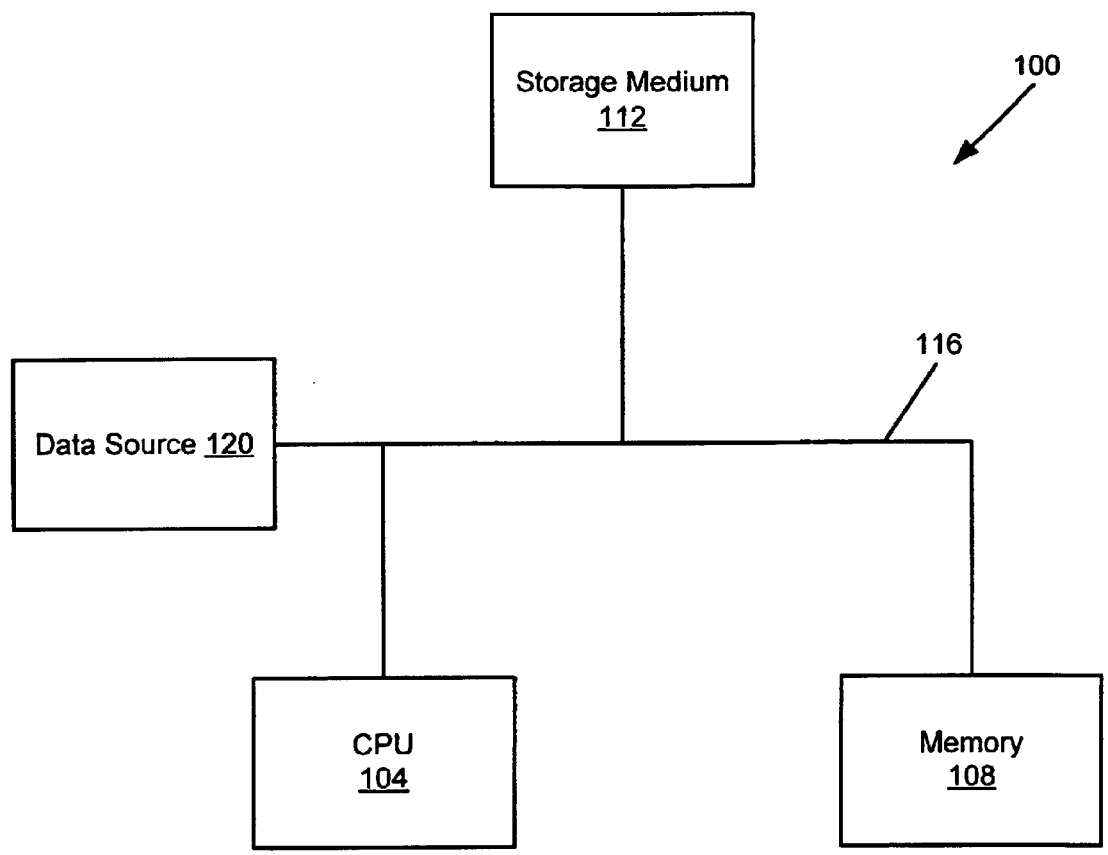
FIG. 1 is a block diagram of a computer system in accordance with the present invention.

FIG. 1 is a simplified block diagram of a computer system 100 in accordance with the present invention. A central processing unit (CPU) 104 is connected to a memory 108 and a storage media 112 across a bus 116. Bus 116 also connects to a data source 120. The CPU 104 may be a conventional general purpose microprocessor, such as the Intel Pentium series, or may be special-purpose microprocessor or microcontroller designed to execute specific tasks. The data source 120 can be a DVD-ROM, or CD-ROM, or a web site, or any other source of data to be stored on a CPU-accessible drive. The memory 108 is conventional semiconductor memory such as SRAM or DRAM, providing high speed access to data for the CPU 104. In many systems, memory 108 is of small, fixed size and is therefore used for storing data that is frequently accessed, for example, for storing portions of application modules that are currently being executed by the CPU 104. The bus 116 provides a pathway for the transfer of data between the CPU 104, the memory 108, and the storage media 112. The storage media 112 is a hard disk drive, or similar device that is capable of storing a large amount of data for later retrieval. Typically, the storage media 112 stores application modules, information required by application modules, and other data that do not require fast access. If a system requires more memory 108 to store frequently accessed data than is physically present in the system 100, portions of the storage media 112 are allocated as virtual memory, and these portions are used to store the extra frequently accessed data. However, retrieval of data on the storage media 112 requires more time than does retrieval of data from the memory 108, and thus the virtual memory solution for memory overruns is ineffective in applications that require high data rates, for example, over 10 mega-bits per second. The computer system 100 is described in a Von Neumann architecture; however, other processor-memory-storage media configurations are considered to be within the scope of the present invention. The computer system 100 may be implemented in a personal computer, a distributed processing network, in an integrated circuit, or other embodiments as known to one of ordinary skill in the art.

Figure 2:
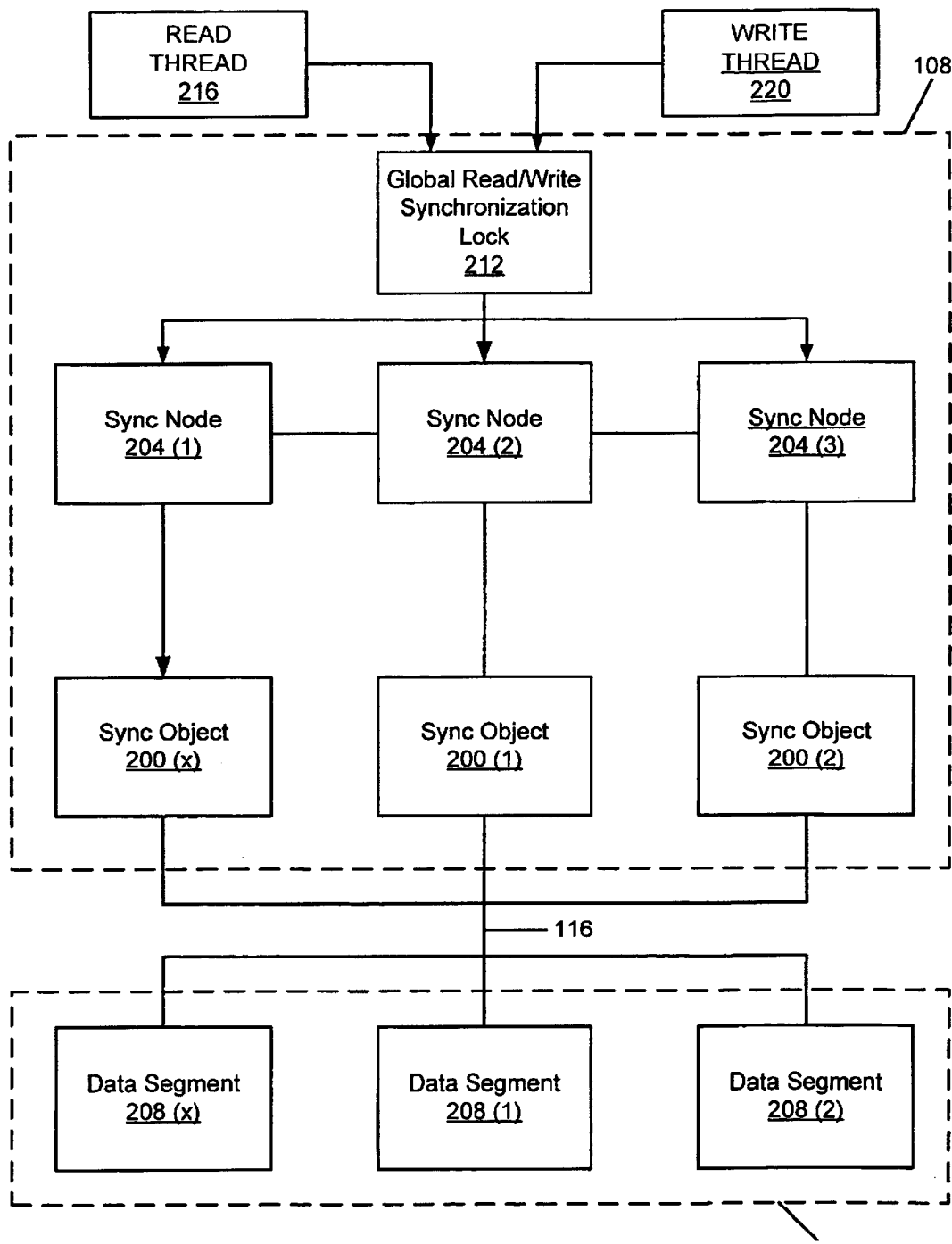
FIG. 2 is a block diagram of a memory management structure in accordance with the present invention.

FIG. 2 is a block diagram of a memory management structure in accordance with the present invention. The storage media 112 is divided into segments 208, and each segment 208 stores multimedia or other information of use to an application module. To allow fast and efficient searching of the storage media 112, the segments 208 are maintained as small as possible. For each segment 204, a memory management structure is implemented that tracks the segment's size and position, and indicates whether a data segment 208 is available. Additionally, the memory management structure can provide other functionality, such as providing a low CPU usage state for a thread that has been denied access to a data segment due to a conflict. As illustrated in FIG. 2, the memory management structure is a synchronization object 200 in combination with a synchronization node 204 and a global sync lock 212. Multiple instances of the memory management structure are shown for clarity; however, the actual number of synchronization objects 200 and nodes 204 maintained at one time in memory 108 is discussed in detail below.

The synchronization object 200 may be an event semaphore, and one synchronization object 200 is assigned to each data segment 208. The synchronization objects 200 are typically created in accordance with default parameters established by the operating system under which the computer system 100 operates, and therefore the low CPU usage state is typically achieved in accordance with the predefined functionality of the operating system. The low CPU usage state optimizes the processing power of the computer system 100, as the CPU 104 is not prioritizing the task of checking the status of the memory management structure. In this state, the CPU checks the state of the object only in times when other tasks are idle thus giving priority to other parts of the application or other programs in the system 100. As the memory management structure containing the synchronization object 200 is typically 20 bytes and there are 200000 (approx. 26 Gig bytes) data segments 208 in a typical storage media 108, megabytes then 20×2000000, or 4000000 bytes, of memory are required to maintain a memory management structure in a computer system used in accordance with the present invention.

Figure 3:
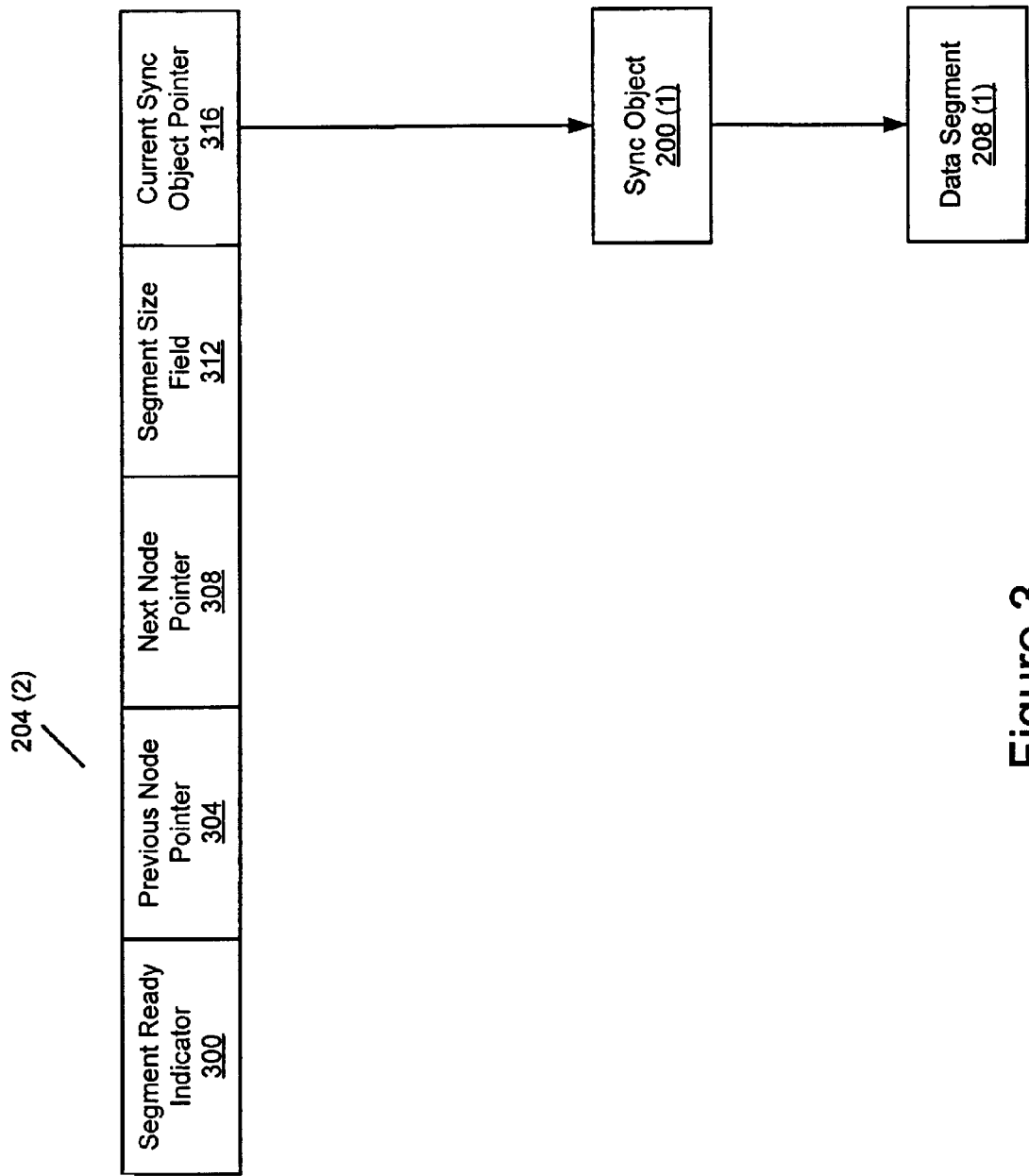
FIG. 3 is a more detailed block diagram of a synchronization node in accordance with the present invention.

In one embodiment, the read thread 216 and the write thread 220 must access a global read/write sync lock 212 prior to gaining access to the sync object 200. The functionality of the sync lock 212 is discussed below. A tracking structure is also implemented to indicate the order in which the data segments 208 should be read. As illustrated in FIG. 2, synchronization nodes 204 are used as the nodes of a link list to provide the tracking structure. As shown in FIG. 3, a synchronization node 204 contains a pointer 316 to a current synchronization object 200, a segment size field 312, a pointer 308 to a next synchronization node, a pointer 304 to a previous synchronization node, and a segment-ready indicator 300. In FIG. 2, the current synchronization node is shown as node 204(2), the previous synchronization node is shown as 204(1), and the next synchronization node is shown as node 204(3). Each synchronization node 204 is linked to a synchronization object 200, and the pointer 316 indicates the synchronization object 200 to which the synchronization node 204 is linked. A segment size field 312 indicates the size of the data segment 208 to which the synchronization node 204 is linked through its synchronization object 200. This enables the read thread 216 to read the data segment 208 because the read thread 216 knows how many sectors of the storage media 108 to read from the segment size field 312 of the synchronization node 204, as discussed below. The pointer 308 to the next synchronization node 204 allows a read thread 216 to identify a next synchronization node 204 to read. The pointer 304 to the previous synchronization node 204 allows the write thread to access a previous node 204 and previous synchronization object 200 to destroy the synchronization object 200 in accordance with the present invention. The segment ready indicator 300 is set by the write thread 220 after the write thread 220 has completed writing to a data segment 204 and allows the read thread 216 to access the data segment 204 without examining the synchronization object 200. The segment ready indicator 300 is of very limited size, and therefore requires much less memory to maintain than does the synchronization object 200. For example, the segment ready indicator 300 can be as small as one bit, which is set to one when the data segment 208 is available and zero when it is not. In a system in which a minimum size is required for a field, the segment ready indicator 300 can be limited to the minimum size permissible, as its functionality can be implemented as a binary flag.

Therefore, in operation, a write thread 220 selects a data segment 208 to write to in accordance with conventional memory allocation techniques. After writing the data, the write thread 220 sets the segment ready indicator 300 to indicate that the data segment 208 is available. Then, the write thread 220 can destroy the synchronization object 200 because it is no longer needed. The read thread 216 will look at the synchronization node 204 to identify the next data segment 204 to read, and will examine the segment ready indicator 300 to determine if it is available. Since the segment ready indicator 300 will indicate that the data segment 208 is available, the read thread 216 can go to the location specified by the segment size field and read for a size length specified by the segment size field 312. The next location is determined by dividing the requested location (in number of bytes) by the segment size field 312. This determines how many segments the real thread 216 should skip before beginning to read. Thus, the computer system 100 is not required to maintain memory to store the synchronization object 200; it merely maintains the amount of memory required to store the additional segment ready indicator 300 of the synchronization node 204. This difference in memory requirement greatly lessens the memory requirements of the memory management system.

The present invention still provides for optimal processing time of the computer system 100. If the write thread 220 has not finished with a data segment 208 prior to the read thread attempting to gain access, the read thread 216 checks the segment ready indicator 300 which will indicate that the data segment 208 is not available. Then, the read thread 216 still checks the synchronization object 200 in accordance with the present invention, because upon determining that the data segment 208 is not available, the read thread 216 is placed into the low CPU usage state provided by the synchronization object 200. Therefore, although memory savings are achieved, the full functionality of the memory management system is retained. After reading the data segment 208, the read thread 216 destroys the synchronization node 204 of the data segment 208 just read, and thus this memory is also made available to the computer system 100. This additional memory savings further enables the computer system 100 to use the high-speed memory 104 for its memory management functions, and therefore provides a more robust and faster computer system 100 than conventional systems.

Figure 4:
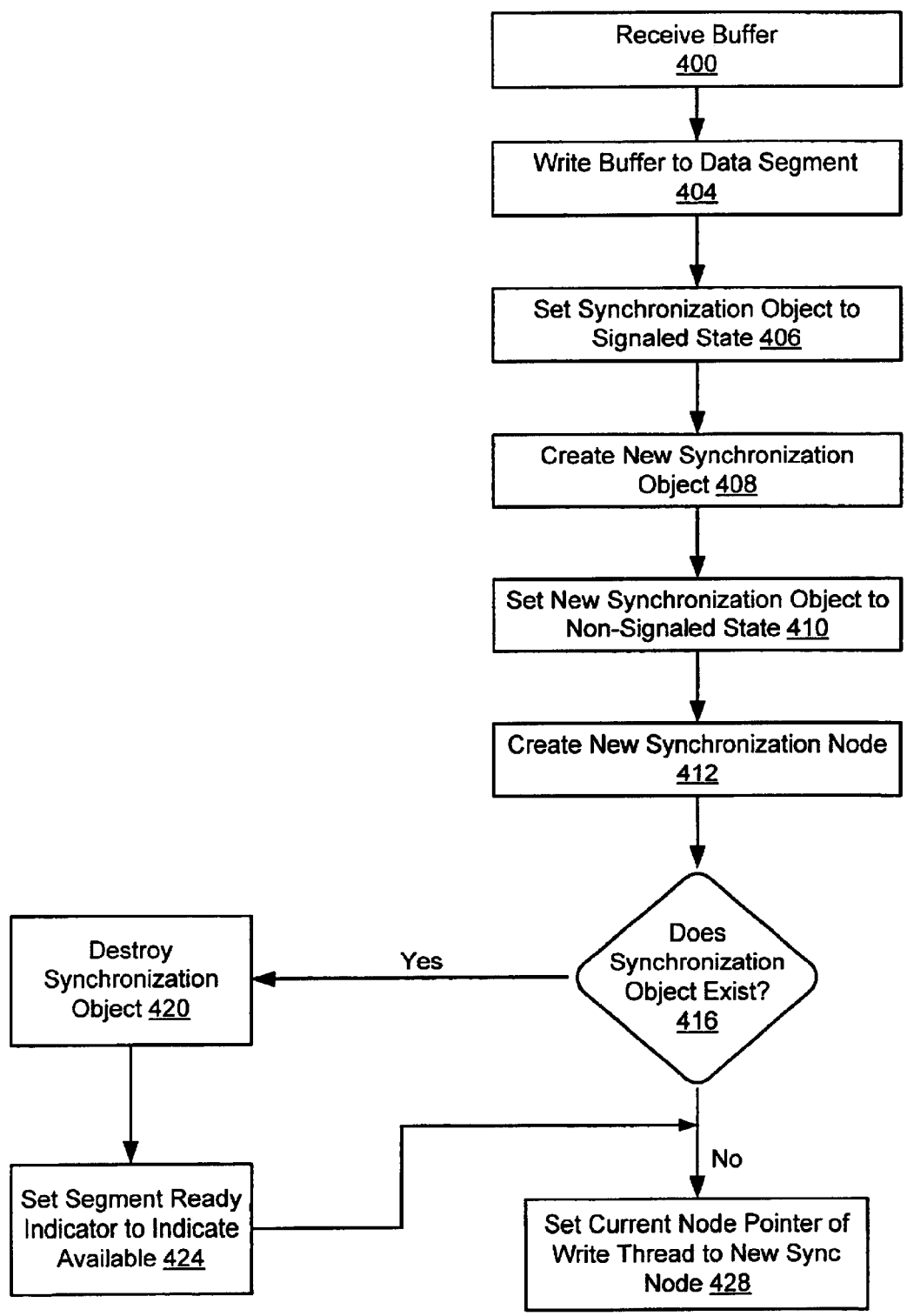
FIG. 4 is a flow chart illustrating the operation of the write thread in accordance with the present invention.

FIG. 4 illustrates the processing of the write thread 220 in more detail. The different synchronization nodes, previous, current, and next are discussed as shown in FIG. 2. First, a buffer is received 400 from a data source 120. The buffer size is typically determined by the constraints of the operating system and bus width, any buffer size can be used in accordance with the present invention. If this is the first instance of receiving data, a write thread 220 is generated by the CPU 104. If the write thread 220 has been generated previously, the buffer is written 404 to a data segment 200(1) of the storage medium 112, and the size of the buffer is added to the segment size field 312 of the synchronization node 204 to which the write thread 220 is currently associated. This allows the write thread 220 to track where on the storage medium 112 the next data is to be written, because the storage medium 112 is sequentially accessed. For example, if the storage medium is 20 gigabytes, and the data that has been stored occupies 64 kilobyte in 32 kilobyte segments, then after writing a next segment of 32 kilobytes, the segment size field 312 is updated to 96 kilobytes, and the write thread 220 knows to store the next buffer at the segment 208 beginning after 96 kilobytes. The state of the synchronization object 200(1) pointed to by the current node 204(2) is then set 406 to a signaled state, which allows the read thread 216 access to the data segment 208(1).

Next, a new synchronization object 200(2) is created 408 by the CPU 104 in memory 108 to point to a next data segment 208(2) to which data is to be written. The synchronization object 200(2) is created in accordance with the operating system under which the CPU 104 operates. Preferably, an operating system application program interface (API) is used to create an event semaphore. The new synchronization object 200(2) is set 410 in a non-signaled state. As discussed above, the non-signaled state prohibits the read thread 216 from reading the next data segment 208(2) associated with the synchronization object 200(2). As the data segment 208 associated with this synchronization object 200(2) has not yet been written, the read thread 216 cannot be allowed to access the next data segment 208(2) or it will read erroneous information.

Then, a new synchronization node 204(3) is created 412 by the CPU 104 to link to the next data segment 208(2). The next synchronization node pointer 308 of the current node 204(2) is set to point to the new node 204(3). The previous synchronization node pointer 304 of the new node 204(3) is set to point back to the current node 204(2). The next synchronization node pointer 308 of the new node 204(3) is set to zero, as there is no node 204 to which it can point. The current synchronization object pointer is set to point to the new synchronization object 200(2).

Then the write thread 220 determines 416 whether the previous synchronization object 200(1) is still alive, or whether it has been destroyed by the read thread 216. If it has not been destroyed by the read thread 216, the write thread 220 destroys 420 the previous synchronization object 200(1), thus allowing the memory required to store the previous synchronization object 200(1) to be used for other purposes, for example, for storing a new synchronization object 200. After destroying the synchronization object 200(1), the segment ready indicator 300 is set 424 to allow the read thread 216 access to the data segment 208(1). Thus, the much smaller in size segment ready indicator 300 replaces the larger synchronization object 200, and thus a net benefit in memory usage is provided. However, by continuing to use the synchronization object 200 up until the point at which the write thread 220 no longer requires access to the data segment 208 to which the synchronization object 200 points, a low CPU usage state is provided to the read thread if the read thread 216 attempts to access the data segment 200 while the write thread 220 is still writing data to the data segment 208.

If the synchronization object is destroyed, then the CPU 104 sets 428 the current node pointer of the write thread 220 to the new synchronization node 204(3). When a new buffer is received, the new data is written to the next data segment 208 indicated by synchronization node 204.

Figure 5:
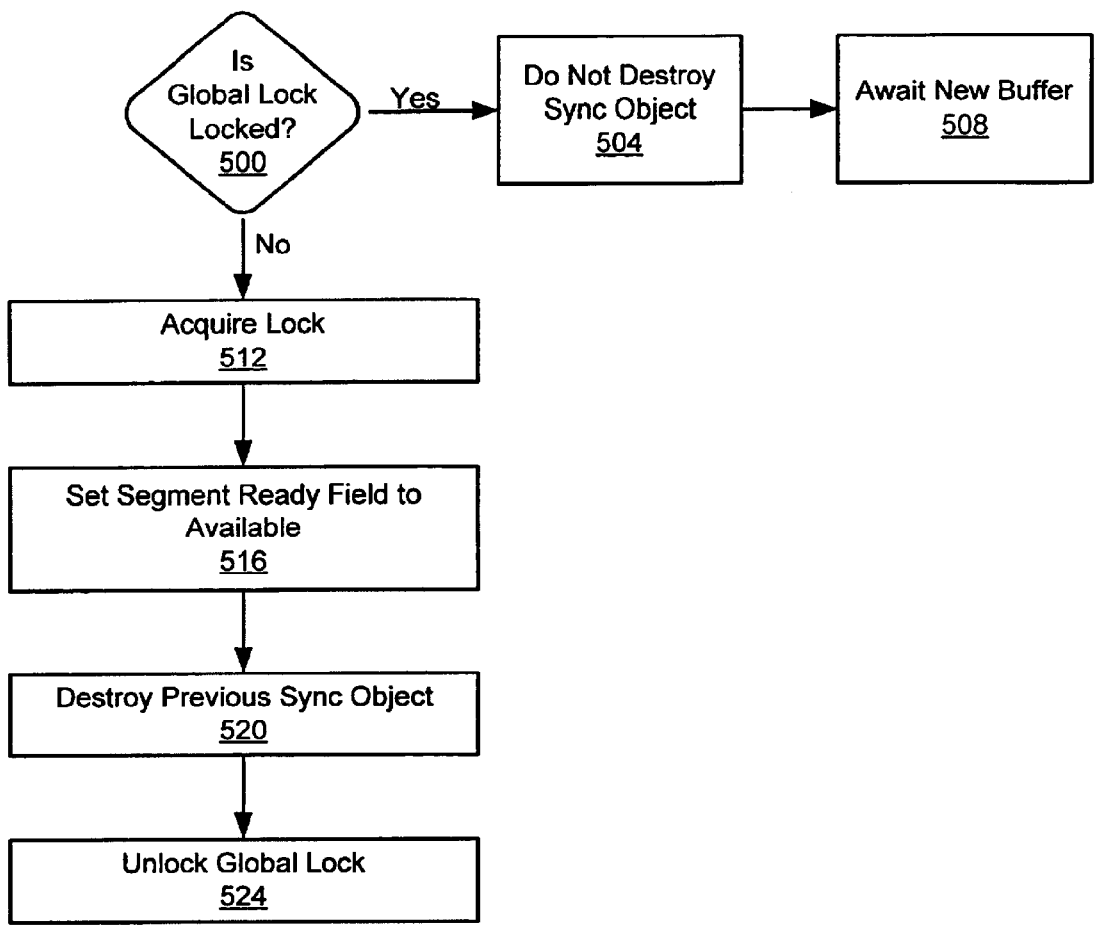
FIG. 5 is a flow chart illustrating a more detailed operation of the process of determining whether a synchronization object can be destroyed by the write thread in accordance with the present invention.

FIG. 5 is a flow chart illustrating a more detailed operation of the process of determining whether a synchronization object 200 can be destroyed by the write thread 220 in accordance with the present invention. In this embodiment, the write thread 220 attempts to ensure that the read thread 216 is not currently accessing the data segment 208 to be destroyed. For example, a situation could arise in which the write thread 220 is ready to destroy the previous synchronization object 200, and checks to see whether the previous synchronization object 200 still exists. If it does exist, the write thread 220 destroys the synchronization object 200. However, it is possible that the read thread 216 has accessed the synchronization object 200 when the write thread 220 was creating the next synchronization node 204 as described above. If the read thread 216 has gained access to the data segment 208, the write thread 220 should not destroy the synchronization object 200 because this may cause an error when the read thread 216 leaves the data segment 208 and expects to destroy the synchronization object 200. In one embodiment, this potential problem is solved by simply having the write thread 220 change the signal state of the synchronization object 200(2) only after the write thread 220 has finished creating the new synchronization node 204(3). This prevents the read thread 216 from accessing the synchronization object 200(1) in the absence of the write thread 220, and the write thread 220 can then go back to the synchronization object 200(1) to destroy it without the possibility that the read thread 216 has accessed the write thread 220. If the read thread 216 attempts to access the synchronization object 200 in the non-signaled state, the read thread 216, as discussed above, waits in the low CPU usage state.

However, this solution may cause a delay in the reading of data if the read thread 216 is not permitted to access data as soon as it becomes available. Therefore, in one embodiment, a global read/write lock synchronization 212 is maintained in memory 108, as shown in FIG. 2. This global lock 212 prevents a read thread 216 or a write thread 220 from accessing a new synchronization object 200 if the global lock 212 is locked. Therefore, in this embodiment, when the read thread 216 accesses a synchronization object 200, it sets the global read/write lock 212 to prevent the write thread 220 from accessing a new synchronization object 200. Thus, when the write thread 220 checks to see if a synchronization object 200 is still alive, the write thread 220 determines 500 whether the global read/write lock 212 is locked. If it is locked, the write thread 220 knows that the read thread 216 is accessing the data segment 208, and the write thread 220 does not destroy 504 the synchronization object 200, and awaits 508 a new buffer for writing. The read thread 216 will destroy the synchronization object 200 after it has read the data, as discussed in more detail below.

If the global read/write lock 212 is not locked, the write thread 220 acquires 512 the lock 212 to prevent the read thread 216 from accessing the synchronization object 200 (1). Then the write thread 220 checks the previous node pointer 304 of the new node 204(3) to locate the position of the previous node 204(2). The segment ready field 300 of the previous node 204(2) is set 516 to indicate availability, and the previous synchronization object 200(1) is destroyed 520. The write thread 220 then unlocks 524 the global read/write lock, and the read thread 216 is free to access the data segment 208(1).

Figure 6:
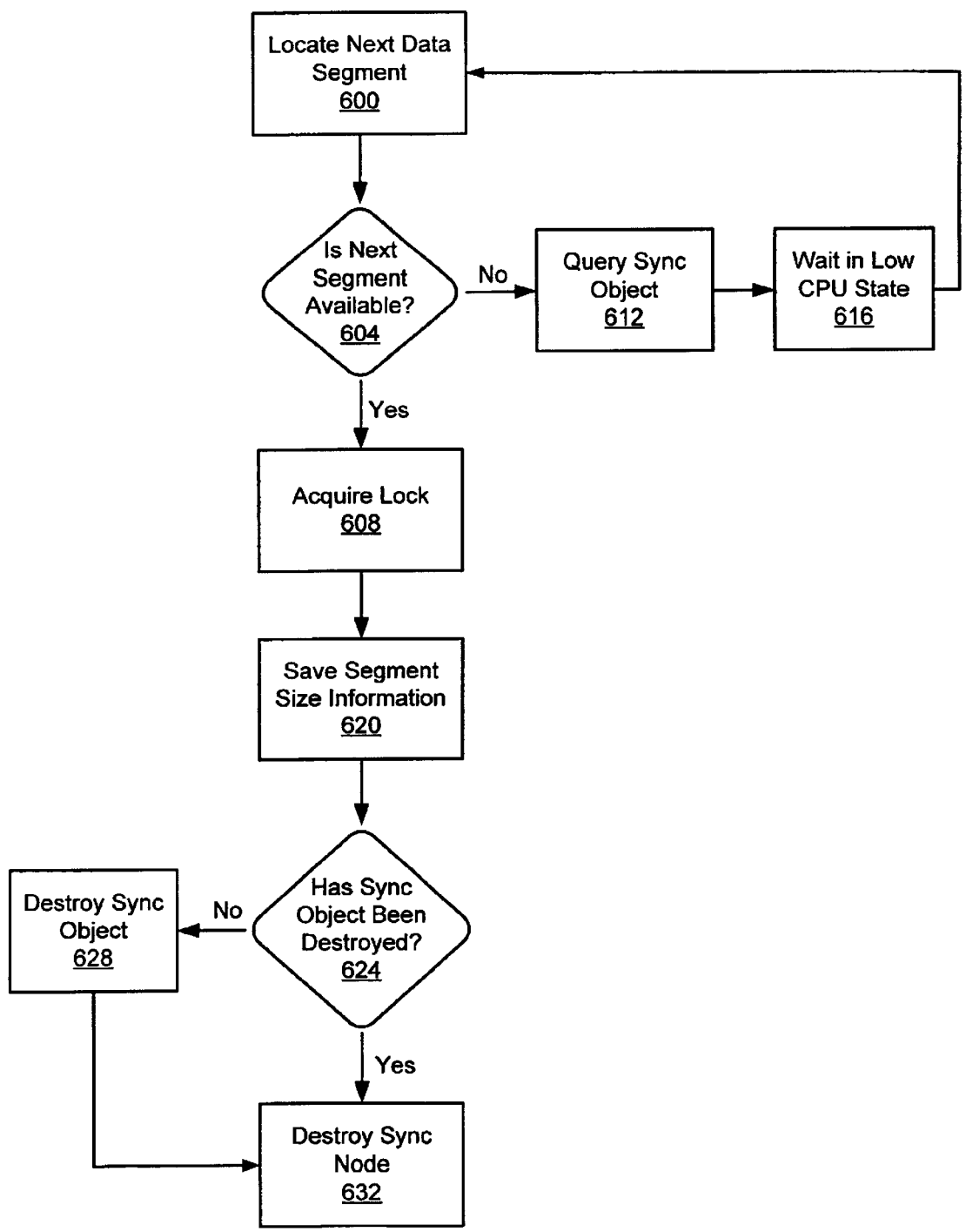
FIG. 6 is a flow chart illustrating the operation of the read thread in accordance with the present invention.

FIG. 6 is a flowchart illustrating the operation of the read thread in accordance with the present invention. First, the read thread 216 locates 600 the next data segment 208(1) to be read by following the next node pointer 308. Then, the read thread 216 checks 604 the segment ready field 300 to determine whether the next data segment 208(1) is available. If it is, the read thread 216 reads the data stored in the data segment 208(1) as described below. If it is not, the read thread 216 queries 612 the state of the associated synchronization object 200(1). The state of the synchronization object 200(1) will be in the not-signaled state, and the read thread 216 will wait 616 in the operating system's low-CPU usage state until the synchronization object 200(1) is set by the write thread 220 to signaled. The synchronization object 200(1) will always be in the non-signaled or unavailable state when the read thread 216 checks it, because if the synchronization object 200 is in the signaled or available state, the write thread 220 would have set the segment ready field 300 to indicate that the data segment 208 is available, and the read thread 216 then proceeds directly to reading the data segment 208 without examining the synchronization object 200. However, it is important for the read thread 216 to query the synchronization object 200(1), because the query is typically required in order to evoke the low-CPU usage state.

To read the data segment 208, the read thread 216 attempts to acquire 608 the read/write lock 212. This is to ensure that the write thread 220 is not in the process of destroying the synchronization object 200. Once the lock is acquired, the read thread 216 saves 620 the segment size information stored in the segment size field 312 of the synchronization node 204 to memory 108. The segment size information is saved because this information is all the read thread 216 requires to determine the location of the data to be read, as discussed above. Then, the read thread 216 determines 624 whether the synchronization object 200(1) has been destroyed by the write thread 220. If it has not, the read thread 210 destroys 628 the synchronization object 200. Then, the read thread 216 destroys 632 the synchronization node 204(2), thus freeing this portion of memory 108 for other purposes.

In one embodiment, the read thread 216 destroys the synchronization object 200(1) and the synchronization node 204(2) by first setting the current synchronization node pointer of the read thread 216 to the current node's next node pointer 308. Thus, the read thread is now pointing to the next node 204(3), which allows it to later destroy the previous node 204(2). Then, the read thread 216 checks the synchronization object 200 pointer of the node 204(2) pointed to by current node's previous node pointer 304, which is pointing back to node 204(2). If the pointer is non-zero, i.e., if it still exists, then the pointer is set to a null value. This destroys the synchronization object 200 and frees the memory required to maintain the synchronization object 200 for other purposes. Then, the read thread 216 destroys the synchronization node by setting the previous node pointer 304 of the next synchronization node 204(3) to a null value. This effectively releases the memory required to maintain the previous synchronization node 204(2). This aligns the read thread 216 with the next data segment 208 to be read. Then, the read thread 216 performs the read operation by reading a segment of the saved size from the storage medium 112 into a buffer.

While the present invention has been described with reference to certain preferred embodiments, those skilled in the art will recognize that various modifications may be provided. These and other variations upon and modifications to the preferred embodiments are provided for by the present invention.

What is claimed is:

1. A method for minimizing memory requirements of a system in which read and write threads are used to access a storage medium, the storage medium comprising data segments, and each segment is associated with a synchronization object for indicating a status of availability of data stored on the data segment to which the synchronization object is associated, and for providing a low processor-intensive state for an accessing thread if the associated data segment is not available to be accessed, the method comprising the steps of:

examining a state of a segment ready indicator field to determine whether a data segment is available to be read, wherein the segment-ready indicator field requires less memory to maintain than a synchronization object requires;

responsive to the segment ready indicator field indicating that the data segment is not available to be read, waiting in a low-processor intensive state for the data segment to become available;

responsive to the segment ready indicator field indicating that the data segment is available to be read, reading the data segment without accessing the synchronization object;

responsive to completing reading the data segment, determining whether the synchronization object still exists; and responsive to the synchronization object still existing, destroying the synchronization object.

2. The method of claim 1 further comprising:

responsive to destroying the synchronization object, destroying the synchronization node to free memory required to maintain the synchronization node for other purposes.

3. The method of claim 1 wherein destroying the synchronization object comprises:

reallocating memory required to store the synchronization object for a new synchronization object.

4. A method for minimizing memory requirements of a system in which read and write threads are used to access a storage medium, the storage medium comprising data segments, and each segment is associated with a synchronization object for indicating a status of availability of data stored on the data segment to which the synchronization object is associated, and for providing a low processor-intensive state for an accessing thread if the associated data segment is not available to be accessed, the method comprising the steps of:

creating a synchronization object linked to a data segment to which data is to be written;

creating a synchronization node to indicate a location of the created synchronization object;

setting the status of the created synchronization object to indicate the data segment to which the synchronization object is associated should not be accessed by a read thread;

setting the status of a previous synchronization object to indicate that the data segment associated with the previous synchronization object may be accessed by the read thread;

determining whether the previous synchronization object still exists; and responsive to the previous synchronization object still existing, destroying the previous synchronization object to render the memory required to maintain the synchronization object available for other uses.

5. The method of claim 4 in a system in which a global synchronization lock is used to indicate whether a read or write thread is currently using a synchronization object, wherein destroying the previous synchronization object further comprises:

determining whether the read thread is currently using the previous synchronization object responsive to a status of the global synchronization lock;

responsive to determining that the read thread is using the previous synchronization object, permitting the read thread to destroy the synchronization object.

6. The method of claim 5 further comprising:

responsive to determining that the read thread is not using the previous synchronization object, destroying the synchronization object.

7. The method of claim 4 wherein destroying the synchronization object further comprises:

setting a segment-available field to indicate that the data segment linked to the previous synchronization object is available, wherein said segment-available field requires an amount of memory to maintain less than an amount of memory required to maintain the synchronization object; and destroying the synchronization object.

8. The method of claim 7 wherein synchronization nodes include a link indicator indicating the location of a previous node, and wherein destroying the synchronization object further comprises:

setting the link indicator of the next synchronization node to a null state.

9. A method for minimizing memory requirements of a system in which read and write threads are used to access a storage medium, the storage medium comprising data segments, and each segment is associated with a synchronization object for indicating the status of availability of data stored on the data segment to which the synchronization object is associated, and for providing a low processor-intensive state for an accessing thread if the associated data segment is not available to be accessed, the method comprising the steps of:

examining a segment-ready indicator field to determine whether a next data segment is available to be read, wherein the segment-ready indicator field requires less memory to maintain than a synchronization object, and the segment-ready indicator field is linked to the synchronization object associated with the next data segment;

responsive to the segment ready indicator field indicating the data segment is not available, querying the status of the synchronization object linked to the segment ready indicator field;

responsive to the synchronization object indicating the data segment is not available, waiting in a low-processor intensive state provided by the synchronization object until the synchronization object indicates the data segment is available; and responsive to the synchronization object indicating the data segment is available:

reading the data segment; and destroying the synchronization object to free memory required to store the synchronization object.

10. The method of claim 9 further comprising the step of:

responsive to the synchronization object indicating the data segment is available, destroying the synchronization node to free memory required to store the synchronization node for other uses.

11. The method of claim 9 comprising:

responsive to the segment ready indicator field indicating the data segment is available, reading the data segment.

12. The method of claim 9 wherein reading the data segment comprises:

storing segment size information; and reading a segment of the stored size into a buffer.

13. The method of claim 9 wherein the segment ready indicator field is stored within a synchronization node for tracking a location of data stored in the data segments.

14. A method for minimizing memory requirements of a system in which read and write threads are used to access a storage medium, the storage medium comprising data segments, and each segment is associated with a synchronization object for indicating the status of availability of data stored on the data segment to which the synchronization object is associated, and for providing a low processor-intensive state for an accessing thread if the associated data segment is not available to be accessed, the method comprising the steps of:

creating a synchronization object linked to a data segment to which data is to be written;

creating a synchronization node to indicate a location of the created synchronization object;

setting the status of the created synchronization object to indicate the data segment to which the synchronization object is linked should not be accessed by a read thread;

setting the status of a previous synchronization object to indicate that the data segment linked to the previous synchronization object may be accessed by the read thread;

determining whether the previous synchronization object still exists; and responsive to the previous synchronization object still existing, destroying the previous synchronization object to render the memory required to maintain the synchronization object available for other uses and setting a segment-ready indicator field to indicate that the data segment can be accessed by the read thread wherein the segment-ready indicator field requires less memory to maintain than a synchronization object;

examining the segment-ready indicator field to determine whether a next data segment is available to be read;

responsive to the segment ready indicator field indicating the data segment is not available, querying the status of the synchronization object linked to the segment ready indicator field;

responsive to the synchronization object indicating the data segment is not available, waiting in a low-processor intensive state provided by the synchronization object until the synchronization object indicates the data segment is available; and responsive to the synchronization object indicating the data segment is available:
  reading the data segment; and
  destroying the synchronization object to free memory required to store the synchronization object.

15. The method of claim 14 further comprising the step of:

responsive to the synchronization object indicating the data segment is available, destroying the synchronization node to free memory required to store the synchronization node.

16. A computer readable medium encoded with a memory management structure for use with a multi-threaded operating system, comprising:

a synchronization node, comprising:
  a segment ready indicator for indicating when a data segment is available for access;
  a current synchronization object pointer, for indicating a synchronization object to which the synchronization node is linked; and
  a segment size field, for indication a size of a data segment to be read; and a synchronization object, whose size is larger than a size of the segment ready indicator, comprising:
  a link to a data segment;
  a low processor intensive state trigger, for providing a low processor intensive waiting state for a thread when the linked data segment is not available.

17. A computer-readable medium for a system in which read and write threads are used to access a storage medium, the storage medium comprising data segments, and each segment is associated with a synchronization object for indicating the status of availability of data stored on the data segment to which the synchronization object is associated, and for providing a low processor-intensive state for an accessing thread if the associated data segment is not available to be accessed, the computer-readable medium having instructions to cause a processor to:

examine a state of a segment ready indicator field to determine whether a data segment is available to be read;

responsive to the segment ready indicator field indicating that the data segment is not available to be read, wait in a low-processor intensive state for the data segment to become available;

responsive to the segment ready indicator field indicating that the data segment is available to be read, read the data segment without accessing the synchronization object;

responsive to completing reading the data segment, determine whether the synchronization object still exists; and responsive to the synchronization object still existing, destroy the synchronization object; and destroy the synchronization node.

* * * * *